United States Patent Office 3,356,775
Patented Dec. 5, 1967

3,356,775
PURIFICATION OF TRIARYL PHOSPHATES
Robert S. Mitchell, Webster Groves, Mo., assignor to Monsanto Company, a corporation of Delaware
No Drawing. Filed July 31, 1963, Ser. No. 299,099
8 Claims. (Cl. 260—990)

This invention relates to a method for the purification of phosphate esters. More particularly, this invention relates to the purification and decolorization of crude triaryl phosphates by treatment with methanol.

Triaryl phosphates prepared in a conventional manner, such as the reaction of phosphorus oxychloride with a hydroxyaryl compound in the presence of a catalyst, are normally purified by procedures involving washing with caustic followed by treatment with potassium permanganate. Excess potassium permanganate must be removed by a reducing agent such as oxalic acid. Such procedures have several attendant disadvantages. Potassium permanganate is an expensive oxidizing agent, the excess use of which renders such a process commercially unattractive and, as a consequence, requires extreme measures of control. Another disadvantage resides in the existence of insoluble reaction products obtained by the potassium permanganate and oxalic acid treatments, which products must be periodically removed from the process equipment.

It is therefore an object of this invention to provide a novel method for the treatment of crude triaryl phosphates to improve the color thereof.

It is a further object to provide a method for improving the color of triaryl phosphates which is quick and effective but yet sufficiently inexpensive to allow its use on a commercial basis.

These and other objects will readily be understood from the ensuing description of the invention.

According to this invention, the color of crude triaryl phosphates can be greatly improved by contacting said esters with methanol.

The method of this invention can be conveniently carried out by adding the methanol to the crude ester at the completion of the condensation step. The treatment step is carried out, preferably with agitation, at temperatures in the range of from about 50° C. to about 150° C., preferably 75–100° C., for a length of time sufficient to improve the color to the extent desired. As is evident, however, from the examples hereinafter presented, the particular temperature employed can readily be selected by those skilled in the art after consideration of various factors, such as the length of reaction time available and the extent of color improvement desired. The excess methanol is removed by distillation. The esters are then treated with the standard lye and water washes and dehydrated.

The amount of methanol employed will necessarily depend upon the ester treated and the extent of purification and color improvement desired. In most instances, amounts varying from about 10.0% to about 50% by weight, based on the weight of the ester to be treated, will provide excellent results. A significant improvement in quality can be effected, however, by the use of smaller amounts of as little as about 1.0%. Much larger amounts, as high as 100%, can be employed but are generally not needed, and the use of such amounts is therefore wasteful. The specific amount needed for a given application can be readily determined by noting the color obtained by the addition of a known quantity of methanol.

This invention is suitable for the decoloration of tertiary phosphates prepared from hydroxyaryl compounds. The triaryl phosphates may be produced in a conventional manner, such as the reaction of an excess of the hydroxyaryl compound with phosphorus oxychloride in the presence of a catalytic amount of a metal halide. Hydroxyaryl compounds which can be used in preparing the instant triaryl phosphates include phenol; othro-, meta-, and para-cresol; any of the isomeric xylenols; any of the isomeric trimethyl phenols; any of the isomeric tetra-methyl phenols; penta-methyl phenol; other substituted phenols such as the ethyl, isopropyl, n-propyl, n-butyl, sec.-butyl, tert.-butyl, amyl, etc., which correspond to the series of methyl-substituted phenols set forth above; phenols substituted with halogen, nitro- and similar groups; etc.

It is to be noted that the process of this invention is not limited to any manner by the particular source of methanol. Thus, for example, the methanol can be produced by a carbon dioxide and hydrogen or a carbon monoxide and hydrogen medium-pressure process, low-pressure hydrogenation of carbon monoxide, direct oxidation of hydrocarbons such as butane, propane and natural gas, saponification of methyl chloride or the destructive distillation of wood.

The phosphate ester in each of the following examples was prepared by the reaction of a hydroxyaryl compound with phosphorus oxychloride in the presence of a catalytic amount of a metal halide. Parts are parts by weight unless otherwise stated. Such examples illustrate the advantageous and unexpected results which are achieved by the use of methanol, but it is not intended that this invention be limited by or to said examples.

Example 1

Into a suitable reaction vessel having means for the addition and removal of liquids and solids, means for agitating the vessel contents, and means for measuring the temperature of liquids in the vessel, there is charged 352.5 grams of a crude triphenyl phosphate ester having a dark yellow color. There is then added 75 ml. of methanol, and the resulting mixture is agitated for about 25 minutes at about 85° C. The mixture is cooled to room temperature and filtered. A white granular or crystalline precipitate remains on the filter, and the filtrate is a clear colorless oil. The filtrate or ester is washed with a series of lye and water washes and dehydrated under vacuum. A final color of about 80 APHA is obtained for the treated ester.

Example 2

Generally following the procedure of Example 1, 307 grams of a crude tricresyl phosphate ester having a deep orange color is treated with 150 ml. of methanol. The resulting mixture is agitated at 70° C. for about 2 hours. The treated ester has a very light yellow color.

Example 3

Into a suitable reaction vessel (as described above), there is charged 335.3 grams of crude triphenyl phosphate having a yellow color. There is then added 100 ml. of methanol, and the resulting mixture is agitated for about 50 minutes at 80° C. The excess methanol is removed by distillation. The treated ester is washed with several lye and water washes, dried and filtered. The final color of the treated ester is 25 APHA.

Other modes of applying the principles of this invention will be apparent to those skilled in the art. Accordingly, while this invention has been described with reference to various specific examples and embodiments, it is understood that the invention is not limited thereto and that it may be variously practiced within the scope of the following claims.

The embodiments of the invention in which an exclusive property or privilege is claimed are defined as follows:

1. In a process which comprises the preparation of triaryl phosphates by reacting a compound selected from the group consisting of hydroxyaryl and mixed hydroxyaryl compounds with phosphorous oxychloride in the presence of a metal halide catalyst to form a crude triaryl phosphate, the improvement which comprises contacting said phosphate with from about 1.0% to about 100% by weight of methanol based on the weight of the phosphate, at a temperature of from about 50° C. to about 150° C., cooling and filtering to recover the phosphate.

2. A process as set forth in claim 1 wherein the amount of methanol used is equivalent to about 10% to 50% by weight of the phosphate.

3. A process as set forth in claim 1 wherein the temperature is from about 75° C. to about 100° C.

4. A process as set forth in claim 1 wherein the metal halide catalyst is aluminum chloride.

5. In a process which comprises the preparation of triphenyl phosphate by reacting phenol with phosphorus oxychloride in the presence of aluminum chloride, the improvement which comprises contacting said triphenyl phosphate with from about 1.0% to about 100% by weight of methanol based on the weight of the phosphate, at a temperature of from about 50° C. to about 150° C., cooling and filtering to recover the triphenyl phosphate.

6. A process as set forth in claim 5 wherein the amount of methanol used is equivalent to about 10% to 50% by weight of the phosphate and the temperature range is from about 75° C. to about 100° C.

7. In a process which comprises the preparation of tricresyl phosphate by reacting cresylic acid with phosphorus oxychloride in the presence of aluminum chloride, the improvement which comprises contacting said tricresyl phosphate with from about 1.0% to about 100% by weight of methanol based on the weight of the phosphate at a temperature of from about 50° C. to about 150° C., cooling and filtering to recover the tricresyl phosphate.

8. A process as set forth in claim 7 wherein the amount of methanol used is equivalent to about 10% to about 50% by weight of the phosphate and the temperature range is from about 75° C. to about 100° C.

References Cited

UNITED STATES PATENTS

| | | | |
|---|---|---|---|
| 1,958,210 | 5/1934 | Scott | 260—990 X |
| 2,272,193 | 2/1942 | Fisher et al. | 260—990 |
| 2,335,511 | 11/1943 | Havemann et al. | 260—990 |
| 2,605,279 | 7/1952 | Edwards | 260—990 |

CHARLES B. PARKER, *Primary Examiner.*

JOSEPH P. BRUST, *Examiner.*

F. M. SIKORA, A. H. SUTTO, *Assistant Examiners.*